United States Patent
Tojigamori (10) Patent No.: US 11,817,580 B2
(45) Date of Patent: Nov. 14, 2023

(54) ACTIVE MATERIAL, AND FLUORIDE ION BATTERY

(71) Applicant: TOYOTA JIDOSHA KABUSHIKI KAISHA, Toyota (JP)

(72) Inventor: Takeshi Tojigamori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 15/931,057

(22) Filed: May 13, 2020

(65) Prior Publication Data

US 2020/0381730 A1   Dec. 3, 2020

(30) Foreign Application Priority Data

May 28, 2019   (JP) .................................. 2019-099128
Oct. 8, 2019   (JP) .................................. 2019-184996

(51) Int. Cl.
  *H01M 4/58*   (2010.01)
  *H01M 10/05*  (2010.01)
  (Continued)

(52) U.S. Cl.
  CPC ........... *H01M 4/58* (2013.01); *C01B 21/0617* (2013.01); *C01B 21/0622* (2013.01);
  (Continued)

(58) Field of Classification Search
  CPC ........ H01M 4/58; H01M 10/05; H01M 4/364; C01B 21/0617; C01B 21/0622;
  (Continued)

(56) References Cited

U.S. PATENT DOCUMENTS

2003/0142466 A1* 7/2003 Yamada ................ H01M 4/366
                                                           361/528
2010/0233546 A1* 9/2010 Nesper ................. H01M 4/136
                                                           977/773
(Continued)

FOREIGN PATENT DOCUMENTS

CN          107086302 A      8/2017
WO     WO-2012118446 A1 *    9/2012 .............. H01M 4/13

OTHER PUBLICATIONS

Kim, Byung Gon, et al. "Ordered mesoporous titanium nitride as a promising carbon-free cathode for aprotic lithium-oxygen batteries." ACS nano 11.2 (2017): 1736-1746. (Year: 2017).*

(Continued)

*Primary Examiner* — Sarah A. Slifka
(74) *Attorney, Agent, or Firm* — Oliff PLC (57) ABSTRACT

A main object of the present disclosure is to provide an active material of which capacity properties are excellent. The present disclosure achieves the object by providing an active material to be used for a fluoride ion battery, the active material comprising: a composition represented by $M^1N_x$ in which $M^1$ is at least one kind of Cu, Ti, V, Cr, Fe, Mn, Co, Ni, Zn, Nb, In, Sn, Ta, W, and Bi, and x satisfies $0.05 \leq x \leq 3$; or a composition represented by $M^2Ln_yN_z$ in which $M^2$ is at least one kind of Cu, Ti, V, Cr, Fe, Mn, Co, Ni, Zn, Nb, In, Sn, Ta, W, and Bi, Ln is at least one kind of Sc, Y, and lanthanoid, y satisfies $0.1 \leq y \leq 3$, and z satisfies $0.15 \leq z \leq 6$.

15 Claims, 4 Drawing Sheets

(51) Int. Cl.
  *H01M 4/36* (2006.01)
  *C01B 21/06* (2006.01)
  *C01B 21/076* (2006.01)

(52) U.S. Cl.
  CPC ...... *C01B 21/0625* (2013.01); *C01B 21/0627* (2013.01); *C01B 21/076* (2013.01); *H01M 4/364* (2013.01); *H01M 10/05* (2013.01); *C01P 2002/72* (2013.01); *C01P 2006/40* (2013.01)

(58) Field of Classification Search
  CPC ............ C01B 21/0625; C01B 21/0627; C01B 21/076; C01P 2002/72; C01P 2006/40
  See application file for complete search history.

(56) References Cited

U.S. PATENT DOCUMENTS

| | | | |
|---|---|---|---|
| 2017/0237067 A1 | 8/2017 | Miki et al. | |
| 2019/0363360 A1* | 11/2019 | Asano | H01M 4/582 |
| 2019/0363361 A1* | 11/2019 | Asano | C04B 35/553 |

OTHER PUBLICATIONS

Le Zhang et al; "Study of all Solid-State Rechargeable Fluoride Ion Batteries Based on Thin-Film Electrolyte;" J Solid State Electrochem; 2017; vol. 21; pp. 1243-1251.

* cited by examiner

ACTIVE MATERIAL, AND FLUORIDE ION BATTERY

TECHNICAL FIELD

The present disclosure relates to an active material and a fluoride ion battery.

BACKGROUND ART

As high-voltage and high-energy density batteries, for example, Li ion batteries are known. The Li ion battery is a cation-based battery utilizing the reaction of Li ions with cathode active materials, and the reaction of Li ions with anode active materials. Meanwhile, as anion-based batteries, fluoride ion batteries utilizing the reaction of fluoride ions (fluoride anions) are known. For example, Non-Patent Literature 1 discloses Cu as an active material used for a fluoride ion battery.

CITATION LIST

Non-Patent Literature

Non-Patent Literature 1: Le Zhang et al., "Study of all solid-state rechargeable fluoride ion batteries based on thin-film electrolyte", J Solid State Electrochem (2017) 21:1243-1251

SUMMARY OF DISCLOSURE

Technical Problem

As the active material used for a fluoride ion battery, an active material with excellent capacity properties has been demanded. The present disclosure has been made in view of the above circumstances and a main object thereof is to provide an active material of which capacity properties are excellent.

Solution to Problem

In order to achieve the object, the present disclosure provides an active material to be used for a fluoride ion battery, the active material comprising: a composition represented by $M^1N_x$ in which $M^1$ is at least one kind of Cu, Ti, V, Cr, Fe, Mn, Co, Ni, Zn, Nb, In, Sn, Ta, W, and Bi, and x satisfies $0.05 \leq x \leq 3$; or a composition represented by $M^2Ln_yN_z$ in which $M^2$ is at least one kind of Cu, Ti, V, Cr, Fe, Mn, Co, Ni, Zn, Nb, In, Sn, Ta, W, and Bi, Ln is at least one kind of Sc, Y, and lanthanoid, y satisfies $0.1 \leq y \leq 3$, and z satisfies $0.15 \leq z \leq 6$.

According to the present disclosure, usage of a specific metal nitride allows an active material to have excellent capacity properties.

In the disclosure, the active material may comprise the composition represented by the $M^1N_x$.

In the disclosure, the $M^1$ may include at least one of Cu, Ti, Fe, and V.

In the disclosure, the active material may comprise the composition represented by the $M^2Ln_yN_z$.

In the disclosure, the $M^2$ may include Mn.

In the disclosure, the Ln may include Ce.

The present disclosure also provides a fluoride ion battery comprising a cathode active material layer, an anode active material layer, and an electrolyte layer formed between the cathode active material layer and the anode active material layer; wherein at least one of the cathode active material layer and the anode active material layer contains the above described active material.

According to the present disclosure, usage of the above described active material allows a fluoride ion battery to have excellent capacity properties.

Advantageous Effects of Disclosure

The present disclosure exhibits an effect of providing an active material with excellent capacity properties.

DESCRIPTION OF EMBODIMENTS

The active material and the fluoride ion battery in the present disclosure will be hereinafter described in details.

A. Active Material

The active material in the present disclosure is an active material to be used for a fluoride ion battery, the active material comprising: a composition represented by $M^1N_x$ in which $M^1$ is at least one kind of Cu, Ti, V, Cr, Fe, Mn, Co, Ni, Zn, Nb, In, Sn, Ta, W, and Bi, and x satisfies $0.05 \leq x \leq 3$; or a composition represented by $M^2Ln_yN_z$ in which $M^2$ is at least one kind of Cu, Ti, V, Cr, Fe, Mn, Co, Ni, Zn, Nb, In, Sn, Ta, W, and Bi, Ln is at least one kind of Sc, Y, and lanthanoid, y satisfies $0.1 \leq y \leq 3$, and z satisfies $0.15 \leq z \leq 6$.

According to the present disclosure, usage of a specific metal nitride allows an active material to have excellent capacity properties. For example, Non-Patent Literature 1 discloses Cu as an active material used for a fluoride ion battery. When Cu is used as a cathode active material, the fluorination of Cu occurs during charge. A copper fluoride has high insulation and thus its resistance increases along with charge proceeds. In specific, when copper fluoride having high insulation is formed, electrons mainly supplied from a conductive material would have difficulty conducting to the reaction site (interface between the metal and the metal fluoride). As a result, charge reaction would not proceed and enough capacity would not be obtained. Incidentally, in Non-Patent Literature 1, although the diffusing distance of fluoride ions is reduced by thinning the shape of an electrode, the resistance is still large and overvoltage is large as well. Because of the above, enough capacity is not obtained compared to the theoretical capacity.

To solve the problem, a specific metal nitride is used as an active material in the present disclosure. A positive hole is introduced when the metal nitride reacts with fluoride ions (when fluorine is doped), and thereby a semiconductor region is formed. This semiconductor region has a function of assisting electron conductivity, and thus the electrons mainly supplied from the conductive material would be easily conducted to the reaction site (interface between the metal and the metal fluoride). As a result, it would be possible to inhibit the charge reaction from not proceeding, and thus the active material may have excellent capacity properties. Further, one of the advantages of the metal nitride is such that not easily affected by surface oxidation since oxidation resistance and water resistance thereof are higher than those of a simple substance of metal. As a result, deterioration of the active material due to factors such as generation of not-intended oxide, may not easily occur. Also, for example, when the active material in the present disclosure is used as a cathode active material, the first charge and discharge would be initiated from charge since the active material in the present disclosure usually does not contain a fluorine element. For that reason, a metal fluoride which is more stable than a simple substance of metal may be used as an anode active material.

The active material in the present disclosure comprises, for example, a composition represented by $M^1N_x$. In $M^1N_x$, $M^1$ is at least one kind of Cu, Ti, V, Cr, Fe, Mn, Co, Ni, Zn, Nb, In, Sn, Ta, W, and Bi. The nitride of $M^1$ is known as a semiconductor. Also, $M^1$ may be just one kind of the aforementioned metal elements, and may be two kinds or more thereof. In $M^1N_x$, x satisfies $0.05 \leq x \leq 3$. The x may be determined depending on the valence of $M^1$. It means that the x may be the value with which the electrical neutrality is maintained.

It is preferable that $M^1$ contains at least one of Cu, Ti, V, Mn, Fe, Co, and Ni among the aforementioned metal elements. Also, the proportion of the specific metal element ($M^{1x}$) in $M^1$ is, for example, 50 mol % or more, may be 70 mol % or more, and may be 90 mol % or more. $M^{1x}$ is one of the metal elements Cu, Ti, V, Cr, Fe, Mn, Co, Ni, Zn, Nb, In, Sn, Ta, W, and Bi.

Examples of the active material comprising the composition represented by $M^1N_x$ may include $Cu_3N$, TiN, $Ti_2N$, VN, MnN, $Mn_2N$, $Mn_3N_2$, $Mn_4N$, FeN, $Fe_2N$, $Fe_3N$, $Fe_4N$, $Fe_8N$, CoN, $Co_2N$, $Ni_3N$, and $Ni_4N$.

The active material in the present disclosure comprises, for example, the composition represented by $M^2Ln_yN_z$. Since the fluoride of Ln has high fluoride ion conductivity, the diffusibility of fluoride ions improves when the fluorination of the active material occurs. In $M^2Ln_yN_z$, $M^2$ is at least one kind of Cu, Ti, V, Cr, Fe, Mn, Co, Ni, Zn, Nb, In, Sn, Ta, W, and Bi. The nitride of $M^2$ is known as a semiconductor. Also, $M^2$ may be just one kind of the aforementioned metal elements, and may be two kinds or more thereof. Ln is at least one kind of Sc, Y, and lanthanoid. Any Ln is a metal element belonging to the third group in the periodic table. Also, Ln may be just one kind of the aforementioned metal elements, and may be two kinds or more thereof. Also, there are no particular limitations on the kind of lanthanoid, and examples thereof may include La, Ce, Pr, Nd, Sm, Eu, Gd, and Tb. In $M^2Ln_yN_z$, y satisfies $0.1 \leq y \leq 3$, and z satisfies $0.15 \leq z \leq 6$. The z may be determined depending on the valence of $M^2$, and the valence and composition (y) of Ln. It means that the z may be the value with which the electrical neutrality is maintained.

It is preferable that $M^2$ contains at least one of Cu, Ti, V, Fe, Mn, Co, and Ni among the aforementioned metal elements. Also, the proportion of the specific metal element ($M^{2x}$) in $M^2$ is, for example, 50 mol % or more, may be 70 mol % or more, and may be 90 mol % or more. $M^{2x}$ is one of the metal elements Cu, Ti, V, Cr, Fe, Mn, Co, Ni, Zn, Nb, In, Sn, Ta, W, and Bi.

It is preferable that Ln contains at least one of Sc, Y, Ce, La, and Nd among the aforementioned metal elements. Also, the proportion of the specific metal element ($Ln^x$) in Ln is, for example, 50 mol % or more, may be 70 mol % or more, and may be 90 mol % or more. $Ln^x$ is one of the metal elements Sc, Y, and lanthanoid.

Examples of the active material comprising the composition represented by $M^2Ln_yN_z$ may include $MnCe_2N_3$, $MnSr_3N_3$, $Fe_{17}Ce_2N_3$, $Fe_{17}Nd_2N_3$, $Fe_{17}Y_2N_{2.4}$, and $BiLa_2N$.

Examples of the shape of the active material may include a granular shape. The average particle size ($D_{50}$) of the active material is, for example, 1 nm or more, and may be 5 nm or more. Meanwhile, the average particle size ($D_{50}$) of the active material is, for example, 30 μm or less, may be 10 μm or less, and may be 5 μm or less. Incidentally, the average particle size ($D_{50}$) may be calculated from, for example, a measurement with a scanning electron microscope (SEM) or a transmission electron microscope (TEM). The number of samples is preferably large; for example, it is 100 or more.

B. Fluoride Ion Battery

Figure 1:
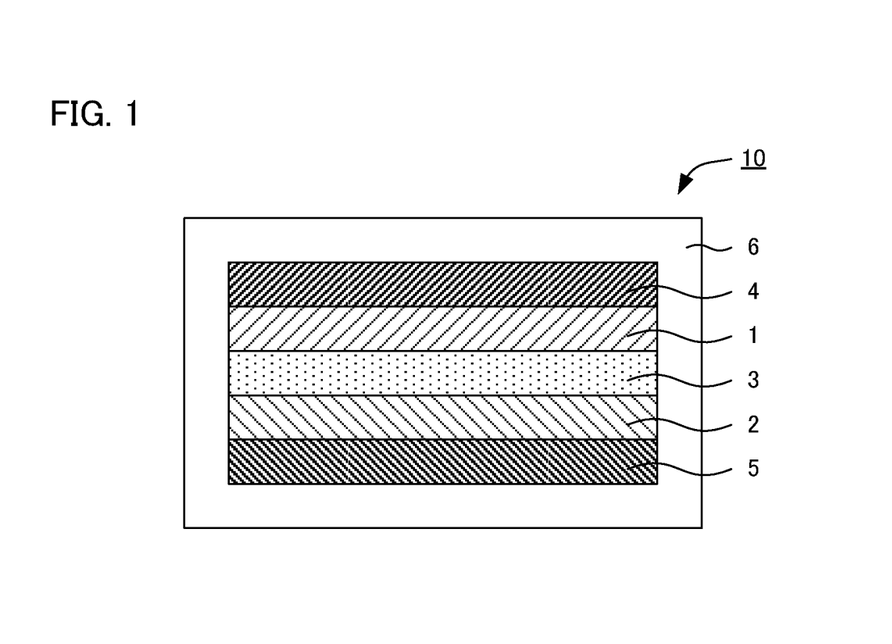
FIG. 1 is a schematic cross-sectional view illustrating an example of the fluoride ion battery in the present disclosure.

FIG. 1 is a schematic cross-sectional view illustrating an example of the fluoride ion battery in the present disclosure. Fluoride ion battery 10 illustrated in FIG. 1 comprises cathode active material layer 1, anode active material layer 2, electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. In the present disclosure, at least one of the cathode active material layer 1 and the anode active material layer 2 contains the above described active material.

According to the present disclosure, usage of the above described active material allows the fluoride ion battery to have excellent capacity properties. Incidentally, in the present disclosure, just the cathode active material layer may contain the above described active material, and just the anode active material layer may contain the above described active material. Also, both of the cathode active material layer and the anode active material layer may contain the above described active material; however, in that case, among the above described active materials, an active material with high reaction potential is used as the cathode active material, and an active material with low potential is used as the anode active material.

1. Cathode Active Material Layer

The cathode active material layer in the present disclosure is a layer containing at least a cathode active material. In the cathode active material, usually, fluorination reaction occurs during charge and defluorination reaction occurs during discharge. Also, the cathode active material layer may further contain at least one of a conductive material, a binder, and an electrolyte, other than the cathode active material.

It is preferable that the cathode active material layer contains the active material described in "A. Active material" above as the cathode active material. In this case, an arbitrary active material with lower reaction potential than that of the above described active material may be used as the anode active material. On the other hand, when the active material described in "A. Active material" above is used as the anode active material, a general cathode active material may be used. Examples of the general cathode active material may include a simple substance of metal, an alloy, a metal oxide, and fluorides of these.

There are no particular limitations on the conductive material if it has desired electron conductivity, and examples of the conductive material may include a carbon material. Examples of the carbon material may include carbon black such as acetylene black, Ketjen black, furnace black and thermal black, graphene, fullerene, and carbon nanotube. The proportion of the conductive material in the cathode active material layer is, for example, 1 weight % or more, and may be 5 weight % or more. If the proportion of the conductive material is too little, there is a possibility excellent electron conducting path may not be formed. Meanwhile, the proportion of the conductive material in the cathode active material layer is, for example, 20 weight % or less, and may be 15 weight % or less. If the proportion of the conductive material is too much, the proportion of the active material would be relatively little, and there is a possibility the energy density may decrease.

There are no particular limitations on the binder if it is chemically and electronically stable, and examples of the binder may include a fluorine-based binder such as polyvinylidene fluoride (PVDF) and polytetra fluoroethylene (PTFE). The electrolyte is in the same contents as those described in "3. Electrolyte layer" later.

Also, the content of the cathode active material in the cathode active material layer is preferably larger from the viewpoint of capacity; for example, it is 30 weight % or more, preferably 50 weight % or more, and more preferably 70 weight % or more. Also, the thickness of the cathode active material layer is, for example, 0.1 μm or more and 1000 μm or less.

2. Anode Active Material Layer

The anode active material layer in the present disclosure is a layer containing at least an anode active material. In the anode active material, usually, defluorination reaction occurs during charge and fluorination reaction occurs during discharge. Also, the anode active material layer may further contain at least one of a conductive material, a binder, and an electrolyte, other than the anode active material.

It is preferable that the anode active material layer contains the active material described in "A. Active material" above, as the anode active material. In this case, an arbitrary active material having higher reaction potential than that of the above described active material may be used as the cathode active material. On the other hand, when the active material described in "A. Active material" above is used as the cathode active material, a general anode active material may be used. Examples of the general anode active material may include a simple substance of metal, an alloy, a metal oxide, and fluorides of these.

Regarding the conductive material, the binder, and the electrolyte, the same materials described in the "1. Cathode active material layer" above may be used. Also, the content of the anode active material in the anode active material layer is preferably larger from the viewpoint of capacity; for example, it is 30 weight % or more, preferably 50 weight % or more, and more preferably 70 weight % or more. Also, the thickness of the anode active material layer is, for example, 0.1 μm or more and 1000 μm or less.

3. Electrolyte Layer

The electrolyte layer in the present disclosure is a layer formed between the cathode active material layer and the anode active material layer. The electrolyte configured in the electrolyte layer may be an electrolyte solution (liquid electrolyte), may be a polymer electrolyte, and may be an inorganic solid electrolyte.

The liquid electrolyte contains, for example, a fluoride salt and a solvent. Examples of the fluoride salt may include an inorganic fluoride salt, an organic fluoride salt, and an ionic solution. Examples of the inorganic fluoride salt may include XF (X is Li, Na, K, Rb, or Cs). Examples of the cation of the organic fluoride salt may include an alkyl ammonium cation such as a tetramethyl ammonium cation. The concentration of the fluoride salt in the liquid electrolyte is, for example, 0.1 mol/L or more, may be 0.3 mol/L or more, and may be 0.5 mol/L or more. Meanwhile, the concentration of the fluoride salt is, for example, 6 mol/L or less, and may be 3 mol/L or less.

Examples of the solvent may include a cyclic carbonate such as ethylene carbonate (EC), fluoroethylene carbonate (FEC), difluoroethylene carbonate (DFEC), propylene carbonate (PC), and butylene carbonate (BC); a chain carbonate such as dimethyl carbonate (DMC), diethyl carbonate (DEC), and ethyl methyl carbonate (EMC); a chain ether such as diethyl ether, 1,2-dimethoxy methane, and 1,3-dimethyoxy propane; a cyclic ether such as tetrahydrofuran and 2-methyl tetrahydrofuran; a cyclic sulfone such as sulfolane; a chain sulfone such as dimethyl sulfoxide (DMSO); a cyclic ester such as γ-butyrolactone; a nitrile such as acetonitrile; and an arbitrary mixture of these. The polymer electrolyte may be obtained by, for example, adding a polymer to an electrolyte solution for gelling the solution.

Meanwhile, examples of the inorganic solid electrolyte may include a fluoride of lanthanoid element such as La and Ce; a fluoride of alkali metal element such as Li, Na, K, Rb, and Cs; and a fluoride of alkaline earth element such as Ca, Sr, and Ba. Also, it is preferable that the inorganic solid electrolyte is a fluoride that contains at least one kind of metal elements La, Ba, Pb, Sn, Ca, and Ce. The inorganic solid electrolyte may contain just one kind of the aforementioned metal elements, and may contain two kinds or more thereof. Specific examples of the inorganic solid electrolyte may include $La_{1-x}Ba_xF_{3-x}$ (0≤x≤2), $Pb_{2-x}Sn_xF_4$ (0≤x≤2), $Ca_{2-x}Ba_xF_4$ (0≤x≤2), and $Ce_{1-x}Ba_xF_{3-x}$ (0≤x≤2). Each of the x may be larger than 0, may be 0.3 or more, may be 0.5 or more, and may be 0.9 or more. Also, each of the x may be smaller than 1, may be 0.9 or less, may be 0.5 or less, and may be 0.3 or less. There are no particular limitations on the shape of the inorganic solid electrolyte, and examples thereof may include a granular shape.

4. Other Constitutions

The fluoride ion battery in the present disclosure comprises at least the above described cathode active material layer, anode active material layer and electrolyte layer. Further, the battery usually comprises a cathode current collector for collecting currents of the cathode active material layer and an anode current collector for collecting currents of the anode active material layer. Examples of the shape of the current collectors may include a foil shape, a mesh shape, and a porous shape. Also, the fluoride ion battery may comprise a separator between the cathode active material layer and the anode active material layer. By arranging the separator, a battery with higher safety may be obtained.

5. Fluoride Ion Battery

The fluoride ion battery in the present disclosure may be a primary battery and may be a secondary battery, but preferably a secondary battery. The reason therefor is to be repeatedly charged and discharged and useful as a car-mounted battery for example. Also, examples of the shape of the fluoride ion battery in the present disclosure may include a coin shape, a laminate shape, a cylindrical shape and a square shape.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

An active material ($Cu_3N$ from RARE METALLIC Co., Ltd.), a solid electrolyte ($PbF_2$ from Kojundo Chemical Laboratory Co., Ltd.) and a conductive material (acetylene black (AB), HS-100 from Denka Company Limited) were weighed so as to be $Cu_3N:PbF_2:AB=30:60:10$ in the weight ratio, mixed by ball milling, and thereby a electrode mixture was obtained. The obtained electrode mixture (working electrode), a solid electrolyte ($La_{0.9}Ba_{0.1}F_{2.9}$) for forming a solid electrolyte layer, a mixture (counter electrode) in which a solid electrolyte ($PbF_2$ from Kojundo Chemical Laboratory Co., Ltd.) and a conductive material (acetylene black (AB), HS-100 from Denka Company Limited) were mixed in the weight ratio of $PbF_2:AB=95:5$, and a Pb foil were compression-power-molded to obtain an evaluation battery.

Example 2

An evaluation battery was obtained in the same manner as in Example 1 except that, in a working electrode, TiN (from Kojundo Chemical Laboratory Co., Ltd.) was used as the active material and $La_{0.9}Ba_{0.1}F_{2.9}$ was used as the solid electrolyte.

Example 3

Figure 2:
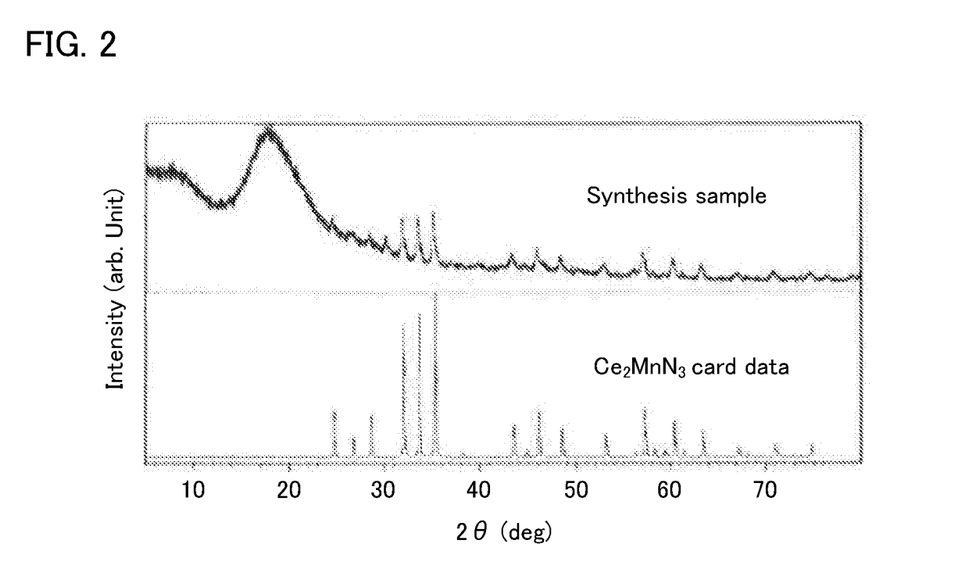
FIG. 2 is the result of an XRD measurement for an active material obtained in Example 3.

In an Ar glove box, a manganese metal (Mn) and a cerium metal (Ce) were weighed so as to be Mn:Ce=1:2 in the molar ratio, crushed, and mixed. The obtained mixture was put in a quartz tube, vacuum drawn, and then burned under nitrogen gas flow in the condition of at 900° C. and for 36 hours. Thereby, an active material ($MnCe_2N_3$) was obtained. When an X-ray diffraction measurement using a CuKα-ray was conducted to the obtained active material, as shown in FIG. 2, typical peaks of $MnCe_2N_3$ were confirmed in the vicinity of $2\theta=32°$, 34°, and 35°, which confirmed that $MnCe_2N_3$ was obtained. An evaluation battery was obtained in the same manner as in Example 2, except that $MnCe_2N_3$ was used as the active material in the working electrode.

Comparative Example 1

An evaluation battery was obtained in the same manner as in Example 1 except that, in a working electrode, Cu was used as the active material.

Evaluation

Charge and discharge tests were conducted to the evaluation batteries obtained in Examples 1 to 3 and Comparative Example 1. The conditions of the charge and discharge test in Example 1 were as follows: temperature: 140° C., final potential in the working electrode: 0.3 V (vs $Pb/PbF_2$) to 1.5 V (vs $Pb/PbF_2$), and current: 50 µA/cm². Also, the conditions of the charge and discharge tests in Examples 2, 3, and Comparative Example 1 were as follows: temperature: 140° C., final potential in the working electrode: −1.5 V (vs $Pb/PbF_2$) to 3 V (vs $Pb/PbF_2$), and current: 50 µA/cm². The results are shown in FIG. 3 to FIG. 6.

Figure 3:
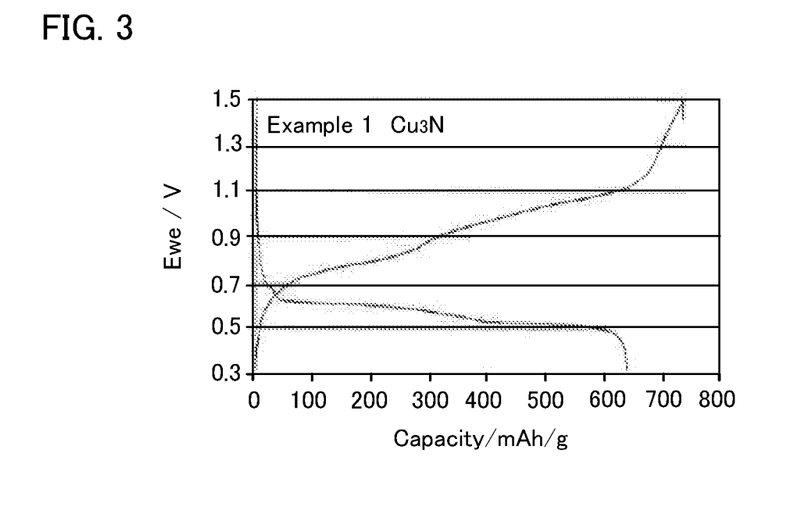
FIG. 3 is the result of a charge and discharge test for an evaluation battery obtained in Example 1.
Figure 4:
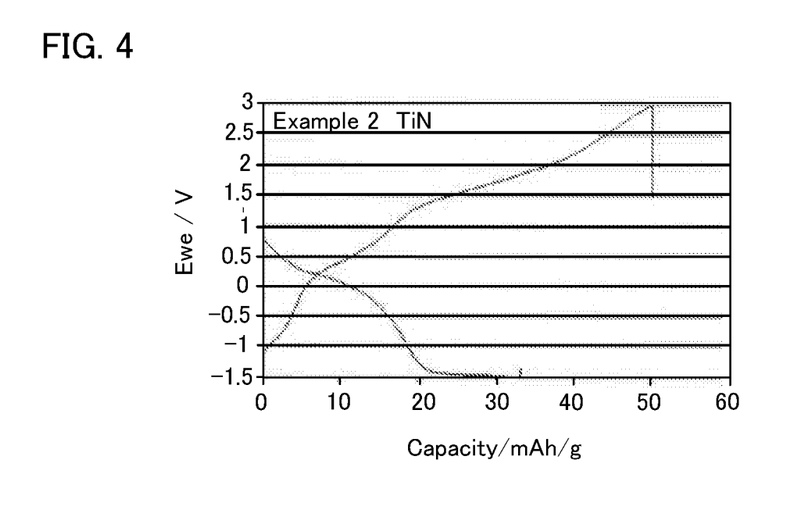
FIG. 4 is the result of a charge and discharge test for an evaluation battery obtained in Example 2.

As shown in FIG. 3, in Example 1 ($Cu_3N$), the plateau of discharge reaction was confirmed at about 0.6 V, and the plateau of charge reaction was confirmed at about 0.8 V. Also, it was confirmed that each of a charge curve and a discharge curve had the plateau of two steps. Also, discharge capacity of approximately 650 mAh/g was obtained, which was close to the theoretical capacity (786 mAh/g). Also, as shown in FIG. 4, in Example 2 (TiN), the plateau of discharge reaction was confirmed at about 0.2 V, and the discharge capacity of approximately 30 mAh/g was obtained.

Figure 5:
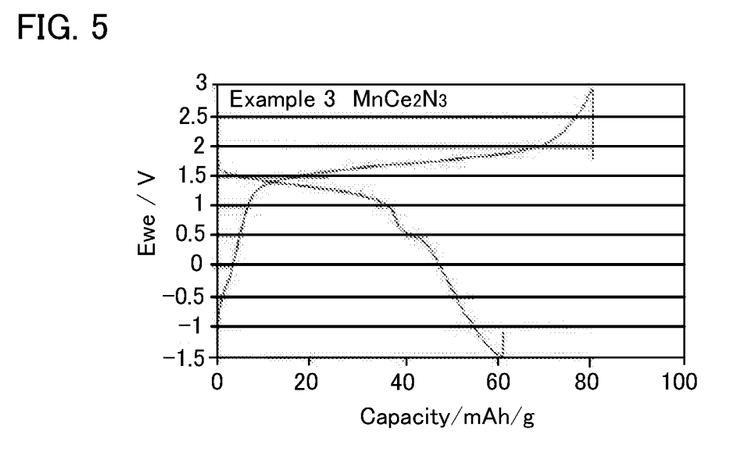
FIG. 5 is the result of a charge and discharge test for an evaluation battery obtained in Example 3.

Also, as shown in FIG. 5, in Example 3 ($MnCe_2N_3$), the plateau of discharge reaction was confirmed at about 1.4 V, and the plateau of charge reaction was confirmed at about 1.6 V, which means that the charge and discharge reactions occurred at extremely high potentials. Also, the potential at which charge reaction occurred was close to the potential at which discharge reaction occurred, and the overvoltage was small; thus, it was suggested that the battery reaction resistance was low. This is presumably because, in addition to the fact that the effect of improving the electron conductivity was exhibited since the active material was nitride, the diffusibility of fluoride ions was also improved since lanthanoid fluorides were generated.

Figure 6:
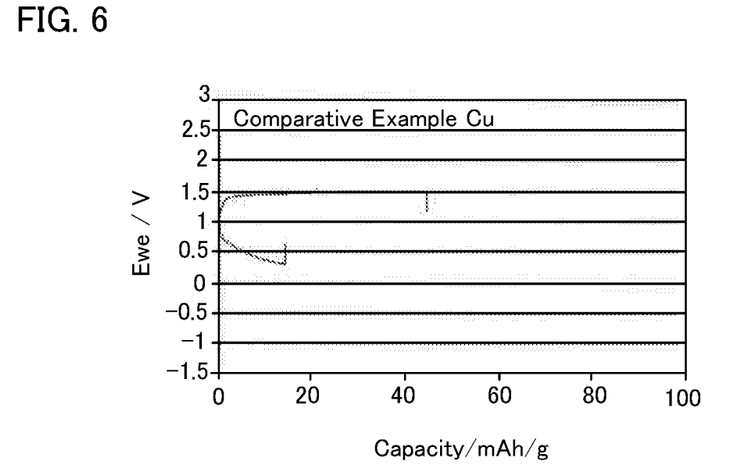
FIG. 6 is the result of a charge and discharge test for an evaluation battery obtained in Comparative Example 1.

Meanwhile, as shown in FIG. 6, in Comparative Example 1 (Cu), the discharge capacity did not reach at 20 mAh/g, which was drastically lower than the theoretical capacity (843 mAh/g). The reason therefor was presumably because the charge reaction did not proceed since the structure in which the surface of the active material (Cu) was covered with an insulator (copper fluoride) was formed when charge started. As a result, it is presumed that the discharge capacity drastically decreased. On the other hand, in Examples 1 to 3, it was confirmed that the active materials with excellent capacity properties were obtained by using the specific nitrides.

Example 4

An evaluation battery was obtained in the same manner as in Example 1 except that, in a working electrode, $Fe_4N$ (from Kojundo Chemical Laboratory Co., Ltd.) was used as the active material, and $La_{0.9}Ba_{0.1}F_{2.9}$ was used as the solid electrolyte.

Example 5

An evaluation battery was obtained in the same manner as in Example 1 except that, in a working electrode, VN (from Kojundo Chemical Laboratory Co., Ltd.) was used as the active material, and $La_{0.9}Ba_{0.1}F_{2.9}$ was used as the solid electrolyte.

Evaluation

Charge and discharge tests were conducted to the evaluation batteries obtained in Examples 4 and 5. The conditions of the charge and discharge tests were as follows: temperature: 140° C., final potential in the working electrode: −1.5 V (vs $Pb/PbF_2$) to 3 V (vs $Pb/PbF_2$), and current: 50 μA/cm². The results are shown in FIG. 7 and FIG. 8.

Figure 7:
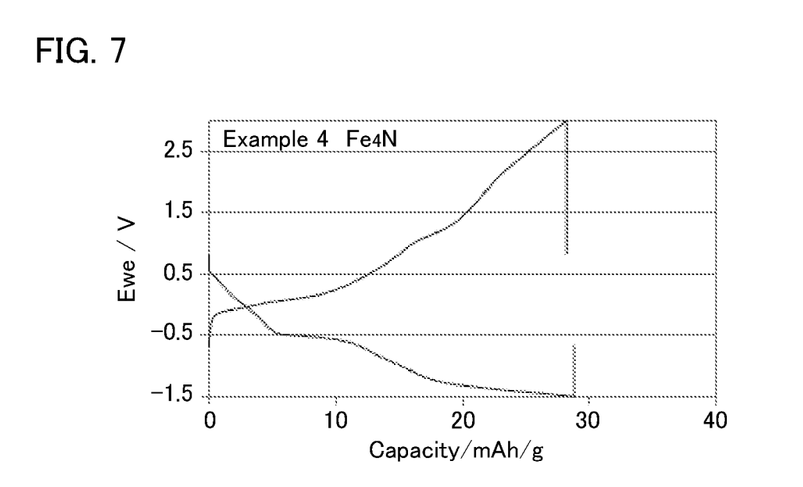
FIG. 7 is the result of a charge and discharge test for an evaluation battery obtained in Example 4.
Figure 8:
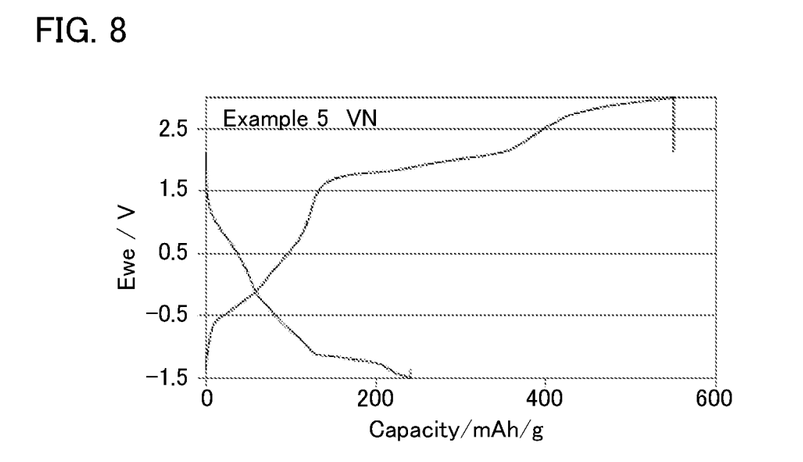
FIG. 8 is the result of a charge and discharge test for an evaluation battery obtained in Example 5.

As shown in FIG. 7, in Example 4 ($Fe_4N$), the plateaus of discharge reaction were confirmed at about −0.5 V and about −1.4 V, and the discharge capacity of approximately 30 mAh/g was obtained. On the other hand, as shown in FIG. 8, in Example 5 (VN), a gentle curve was obtained in the range of about 1.5 V to about −1.1 V in the discharge curve, the plateau of discharge reaction was confirmed at about −1.1 V, and the discharge capacity of approximately 240 mAh/g was obtained.

REFERENCE SIGNS LIST 1 cathode active material layer
2 anode active material layer
3 electrolyte layer
4 cathode current collector
5 anode current collector
6 battery case
10 fluoride ion battery

What is claimed is:

1. A fluoride ion battery comprising a cathode active material layer, an anode active material layer, and an electrolyte layer formed between the cathode active material layer and the anode active material layer; wherein
the cathode active material layer contains an active material comprising:
a composition represented by $M^1N_x$ in which $M^1$ is at least one element selected from the group consisting of Cu, Ti, V, Cr, Fe, Mn, Co, Ni, Zn, Nb, In, Sn, Ta, W, and Bi, and x satisfies 0.05≤x≤3; or
a composition represented by $M^2Ln_yN_z$ in which $M^2$ is at least one element selected from the group consisting of Cu, Ti, V, Cr, Fe, Mn, Co, Ni, Zn, Nb, In, Sn, Ta, W, and Bi, Ln is at least one element selected from the group consisting of Sc, Y, and lanthanoid, y satisfies 0.1≤y≤3, and z satisfies 0.15≤z≤6, wherein
a content of the active material therein is 30 weight % or more, and
the cathode active material layer, the anode active material layer, and the electrolyte layer, each contains an inorganic solid electrolyte having fluoride ion conductivity.

2. The fluoride ion battery according to claim 1, wherein the active material comprises the composition represented by the $M^1N_x$.

3. The fluoride ion battery according to claim 2, wherein the $M^1$ includes at least one of Cu, Ti, Fe, and V.

4. The fluoride ion battery according to claim 1, wherein the active material comprises the composition represented by the $M^2Ln_yN_z$.

5. The fluoride ion battery according to claim 4, wherein the $M^2$ includes Mn.

6. The fluoride ion battery according to claim 4, wherein the Ln includes Ce.

7. The fluoride ion battery according to claim 1, wherein the content of the active material is 50 weight % or more.

8. The fluoride ion battery according to claim 1, wherein the content of the active material is 70 weight % or more.

9. The fluoride ion battery according to claim 1, wherein the active material is $Cu_3N$ or TiN.

10. The fluoride ion battery according to claim 1, wherein the anode active material layer contains an active material comprising:
a composition represented by $M^1N_x$ in which $M^1$ is at least one element selected from the group consisting of Cu, V, Cr, Fe, Mn, Co, Ni, Zn, Nb, In, Sn, Ta, W, and Bi, and x satisfies 0.05≤x≤3; or
a composition represented by $M^2Ln_yN_z$ in which $M^2$ is at least one element selected from the group consisting of Cu, Ti, V, Cr, Fe, Mn, Co, Ni, Zn, Nb, In, Sn, Ta, W, and Bi, Ln is at least one element selected from the group consisting of Sc, Y, and lanthanoid, y satisfies 0.1≤y≤3, and z satisfies 0.15≤z≤6.

11. A fluoride ion battery comprising a cathode active material layer, an anode active material layer, and an electrolyte layer formed between the cathode active material layer and the anode active material layer; wherein
the cathode active material layer contains an active material comprising:
a composition represented by $M^1N_x$ in which $M^1$ is at least one element selected from the group consisting of Cu, V, Cr, Fe, Mn, Co, Ni, Zn, Nb, In, Sn, Ta, W, and Bi, and x satisfies 0.05≤x≤3; or
a composition represented by $M^2Ln_yN_z$ in which $M^2$ is at least one element selected from the group consisting of Cu, Ti, V, Cr, Fe, Mn, Co, Ni, Zn, Nb, In, Sn, Ta, W, and Bi, Ln is at least one element selected from the group consisting of Sc, Y, and lanthanoid, y satisfies 0.1≤y≤3, and z satisfies 0.15≤z≤6, and
the cathode active material layer, the anode active material layer, and the electrolyte layer, each contains an inorganic solid electrolyte having fluoride ion conductivity.

12. The fluoride ion battery according to claim 11, wherein the active material comprises the composition represented by the $M^2Ln_yN_z$.

13. The fluoride ion battery according to claim 11, wherein the $M^2$ includes Mn.

14. The fluoride ion battery according to claim 11, wherein the Ln includes Ce.

15. The fluoride ion battery according to claim 11, wherein the anode active material layer contains an active material comprising:
a composition represented by $M^1N_x$ in which $M^1$ is at least one element selected from the group consisting of Cu, V, Cr, Fe, Mn, Co, Ni, Zn, Nb, In, Sn, Ta, W, and Bi, and x satisfies 0.05≤x≤3; or
a composition represented by $M^2Ln_yN_z$ in which $M^2$ is at least one element selected from the group consisting of Cu, Ti, V, Cr, Fe, Mn, Co, Ni, Zn, Nb, In, Sn, Ta, W, and Bi, Ln is at least one element selected from the group consisting of Sc, Y, and lanthanoid, y satisfies 0.1≤y≤3, and z satisfies 0.15≤z≤6.

* * * * *